United States Patent
Chen

(10) Patent No.: US 8,404,908 B2
(45) Date of Patent: Mar. 26, 2013

(54) PROCESS FOR LIGNIN CONVERSION TO CHEMICALS OR FUELS WITH $H_2$ GENERATED FROM LIGNIN DEPOLYMERIZATION PRODUCTS

(75) Inventor: John Q. Chen, Glenview, IL (US)

(73) Assignee: UOP LLC, Des Plaines, IL (US)

( * ) Notice: Subject to any disclaimer, the term of this patent is extended or adjusted under 35 U.S.C. 154(b) by 747 days.

(21) Appl. No.: 12/578,243

(22) Filed: Oct. 13, 2009

(65) Prior Publication Data

US 2010/0137665 A1  Jun. 3, 2010

(51) Int. Cl.
   *C07C 1/00*   (2006.01)
(52) U.S. Cl. ........ 585/240; 585/242; 585/639; 585/930; 44/605
(58) Field of Classification Search ................. 585/240, 585/242, 930, 639; 44/605
See application file for complete search history.

(56) References Cited

U.S. PATENT DOCUMENTS

| | | |
|---|---|---|
| 5,106,810 A | 4/1992 | Cheng et al. |
| 5,959,167 A | 9/1999 | Shabtai et al. |
| 6,059,995 A | 5/2000 | Topsoe et al. |
| 6,172,272 B1 * | 1/2001 | Shabtai et al. ................ 585/242 |
| 6,649,562 B2 | 11/2003 | Naka et al. |
| 6,939,068 B2 | 9/2005 | Rawlings et al. |
| 7,964,761 B2 * | 6/2011 | Zmierczak et al. ........... 585/242 |
| 2003/0100807 A1 * | 5/2003 | Shabtai et al. ................ 585/240 |
| 2003/0115792 A1 | 6/2003 | Shabtai et al. |
| 2008/0295390 A1 | 12/2008 | Boykin et al. |
| 2009/0203098 A1 | 8/2009 | Verser |

FOREIGN PATENT DOCUMENTS

| WO | WO9910450 A1 | 3/1999 |
|---|---|---|
| WO | WO0011112 A1 | 3/2000 |

OTHER PUBLICATIONS

PCT International Search Report and Written Opinion for PCT/US2010/051550; mailing date Jun. 21, 2011.

* cited by examiner

*Primary Examiner* — Nina Bhat
(74) *Attorney, Agent, or Firm* — Arthur E Gooding

(57) ABSTRACT

A process is presented for the production of high value chemicals from lignin. The process comprises combining several internal steps to use the hydrogen generated by the process, rather than adding an external source of hydrogen. The process can combine the decomposition of oxygenates formed during the deoxygenation process with hydrogenation of deoxygenated lignin compounds.

19 Claims, No Drawings

PROCESS FOR LIGNIN CONVERSION TO CHEMICALS OR FUELS WITH $H_2$ GENERATED FROM LIGNIN DEPOLYMERIZATION PRODUCTS

FIELD OF THE INVENTION

This invention relates to processes for obtaining hydrocarbons from biomass. More particularly, this invention relates to the treatment of lignin and cellulosic waste through a process to produce aromatics while using hydrogen generated from the biomass.

BACKGROUND OF THE INVENTION

Renewable energy sources and sources of chemicals for use in polymers are of increasing importance. They are a means of reducing dependence on imported oil and provide a substitute for fossil fuels. Fossil fuels are also a principal source of materials for basic chemical constituents to be used in other industries, such as chemical monomers for the making of polymers. Biomass is a renewable resource that can provide some of the needs for sources of chemicals and fuels. Part of the challenge of biomass utilization is the efficient recovery of the basic chemical constituents.

Biomass includes, but is not limited to, plant parts, fruits, vegetables, plant processing waste, wood chips, chaff, grain, grasses, corn, corn husks, weeds, aquatic plants, hay, paper, paper products, recycled paper and paper products, and any cellulose containing biological material or material of biological origin. The economics depend on the ability to produce large amounts of biomass on marginal land, or in a water environment where there are few or no other significantly competing economic uses of that land or water environment. The economics can also depend on the disposal of biomass that would normally be placed in a landfill.

The growing, harvesting and processing of biomass in a water environment provides a space where there is plenty of sunlight and nutrients while not detracting from more productive alternate uses. In addition, biomass contributes to the removal of carbon dioxide from the atmosphere as the biomass grows. The use of biomass can be one process for recycling atmospheric carbon while producing fuels and chemical precursors. Biomass when heated in an environment with low or no oxygen will generate a liquid product known as pyrolysis oil. Biomass also contains a significant amount of lignin, which contains a substantial amount of material that can be used as precursors for chemical and fuels. The lignin structure contains aromatic rings that are linked together through carbon-carbon bonds and through carbon-oxygen bonds. The compounds that have high value are the alkyl-benzene compounds and phenolic compounds that can be recovered from the biomass.

One of ways to convert lignin to fuels or chemicals is by base catalyzed depolymerization followed by hydrotreating, as shown in U.S. Patent publications 2003/0100807A1 and 2003/0115792A1. This process uses a strong base to partially break up the lignin compounds. One major problem of this approach is high consumption of strong base such as NaOH which makes it not very attractive from economic stand point of view. Our recent study showed that final pH of reaction product need to be above 12.4 in order to have high lignin conversion. This makes the use of low cost basic materials such as boiler ashes impractical.

Processes that avoid this need for strong bases can shift the recovery of organic precursors from biomass to economically viable processes, as well as lessen the cost of environmental protection for bio-conversion processes.

SUMMARY OF THE INVENTION

The present invention is for a process to produce hydrocarbons from lignin, without the addition of an external source of hydrogen. The process generates hydrogen, that is used in the process, thereby saving time and expense of generating hydrogen from an external source. The process combines lignin with water and a catalyst to form an intermediate stream comprising deoxygenated lignin and light oxygenates. The catalyst can be an acidic or basic catalyst. The light oxygenates are decomposed to form a second intermediate stream comprising hydrogen. The second intermediate stream is contacted with a hydrogenation catalyst to form a product stream comprising deoxygenated and hydrogenated and partially hydrogenated hydrocarbons. The deoxygenated and hydrogenated hydrocarbons are more readily separated and recovered. Conversion of biomass also requires the removal of oxygen which needs hydrogen ($H_2$). It is preferred that the hydrogen can be generated using the biomass on site, instead of importing hydrogen from a hydrogen plant.

The recovered hydrogenated and partially hydrogenated hydrocarbons can be subsequently subjected to dehydrogenation processes to generate a product stream comprising aromatic compounds, or the process stream can be directly converted to aromatics by choosing the proper process conditions.

Additional objects, embodiments and details of this invention can be obtained from the following detailed description of the invention.

DETAILED DESCRIPTION OF THE INVENTION

The conversion of lignin to useful chemicals or fuels entails the breaking of carbon-oxygen bonds. Part of the process includes the generation of hydrogen, while limiting, or preventing the generation of molecules that reduce the value of the process, or reduce the amount of recoverable chemicals or fuels. One such result is preventing the formation of methane ($CH_4$), where the methane carries off valuable hydrogen ($H_2$) that can be used in the depolymerization process. Processing of biomass can provide several benefits, including downstream savings from reducing the amount of waste material placed in landfills.

Lignin comprises a large number of methoxy groups within the lignin structure. The methoxy groups can be hydrolyzed to form oxygenate compounds, such as light alcohols, and in particular methanol. The oxygenates can be easily decomposed through catalytic decomposition, or steam decomposition to generate hydrogen ($H_2$). This is particularly true for the production of methanol from the hydrolyzation of lignin and the decomposition of methanol to form carbon dioxide ($CO_2$) and hydrogen. Thus, hydrogen is produced cheaply and in situ, and can be used in the lignin conversion process.

The present invention aims to combine the functions of generation of hydrogen, and using the hydrogen to recover hydrocarbon compounds from lignin. The process comprises forming a mixture of lignin and water and depolymerizing the lignin in the aqueous mixture using an acidic or basic catalyst under a hydrogen atmosphere. The depolymerization process generates an intermediate mixture of depolymerized lignin, or lignin-D, and light oxygenates. The light oxygenates comprise mainly light alcohols having from 1 to 3 carbon atoms, with methanol being the predominant alcohol.

The intermediate mixture is processed to generate a hydrogen stream in situ for use in the depolymerization process and the hydrogenation process. The light oxygenates in the intermediate stream can be reformed, or decomposed, into a hydrogen containing stream, and the hydrogen produced in situ reduces the need to add external hydrogen, or to have a hydrogen generation plant. The consumption of hydrogen in depolymerization is not extensive, but by combining the steps of depolymerization with the hydrogen production via the decomposition of the oxygenates, there would be savings from the use of cheaply generated hydrogen from the existing raw materials.

One embodiment of the general process uses the following steps:

$$\text{Lignin} + H_2O \rightarrow \text{lignin-D} + \text{methanol} \quad (1)$$

$$\text{Lignin-D} + \text{methanol} \rightarrow \text{lignin-D} + H_2 + CO_2 \quad (2)$$

$$\text{Lignin-D} + H_2 \rightarrow \text{lignin-E} \quad (3)$$

where the first step uses an acidic or basic catalyst, and the reaction is carried out with or without a hydrogen atmosphere. The lignin-D mixture is a mixture of hydrocarbons and light oxygenates, with some undecomposed lignin. The second step uses a second catalyst, or steam, to reform, or decompose, the methanol to hydrogen and carbon dioxide. The catalyst particles are preferably small catalyst particles with large pores. The third step uses a third catalyst to hydrogenate the hydrocarbon compounds in the lignin-D mixture to form the lignin-E mixture. The lignin-E mixture comprises decomposed lignin and hydrogenated hydrocarbon compounds, including naphthenes. The third catalyst comprises a noble metal or nickel on a support.

The process can further include the separation of hydrogenated compounds from the lignin-E mixture, and the hydrogenated compounds can be dehydrogenated to produce an aromatic compound product stream and a hydrogen stream for use in the depolymerization and hydrogenation steps.

The process of the present invention for the production of hydrocarbons and hydrogen comprises forming an aqueous mixture of lignin with an acidic or basic catalyst with or without a hydrogen atmosphere to depolymerize the lignin, thereby forming a depolymerized lignin, or lignin-D, mixture comprising light oxygenates. For acidic depolymerization, it is preferred to have a hydrogen atmosphere. The lignin-D mixture is processed to decompose, or reform, the light oxygenates to liberate hydrogen for use in the depolymerization process. The hydrogen is used in the depolymerization process, and the hydrogen and the depolymerized lignin can be reacted over a hydrogenation catalyst to form a product stream comprising saturated and partially saturated hydrocarbons, such as naphthenes, alkanes, olefins, diolefins, etc. One group of hydrogenated hydrocarbons are saturated ring compounds.

The saturated and partially saturated hydrocarbons, and in particular the saturated and partially saturated ring compounds, can be separated from the product stream and passed over a dehydrogenation catalyst to form aromatic compounds.

During the depolymerization process, the light oxygenates produced can comprise light alcohols having from 1 to 3 carbons. Control is important to minimize the production of methane, or to minimize deoxygenation of the methoxy groups as they are cleaved from the lignin compounds. Control is also important to limit the formation of char during the process, as this is a loss of product, as well as deactivates the catalyst. The lignin comprises a substantial amount of methoxy groups, and the primary oxygenate produced is methanol. The methanol can be reformed, or decomposed, into CO2 and H2. Methanol decomposition can be performed in a number of ways. One method is to decompose the methanol in-situ using a decomposition catalyst that is added to the aqueous lignin mixture, or to the aqueous depolymerized lignin mixture. The methanol can also be decomposed in a separate reactor to generate the hydrogen. When the methanol is decomposed in a separate reactor, it can be catalytically decomposed, or the reaction conditions can be controlled and the methanol can be steam reformed or oxidatively steam reformed with a catalyst. Some of the examples catalyst used in oxidative steam reforming of methanol include Cu—ZnO, Pd—ZnO. However the methanol is decomposed, no additional raw materials are needed for the production of hydrogen.

The decomposition of the oxygenates is preferably with a catalyst. The catalyst for decomposition of the oxygenates comprises at least one metal on a support. The catalytic support comprises a porous material including one or more of the following: inorganic oxides, zeolites, molecular sieves, carbon, silica, silica-alumina, boron nitride, and silica nitride. The metals deposited include one or more of the following metals: chromium, gold, zinc, copper, platinum, silver, palladium, rhodium, rhenium, osmium, ruthenium, iridium, and mixtures of the metals.

The process can further include separating the hydrogen to form a hydrogen rich stream for use in the depolymerization step, or for use in a hydrogenation step. The hydrogenation step includes contacting the depolymerized product stream with a hydrogenation catalyst under a hydrogen atmosphere. The hydrogenation catalyst comprises a noble metal on a support. Selected supports include zeolites, molecular sieves, $Al_2O_3$, $SiO_2$, MgO, $ZrO_2$, $TiO_2$, mixed metal oxides, and porous carbon. The noble metal preferably includes platinum (Pt), palladium (Pd), or both.

Hydrogenation of the depolymerized product stream produces saturated and partially saturated ring compounds. Separation of the saturated and partially saturated ring compounds is easier than separation of the aromatic compounds. The ring compounds can be separated from the mixture and then dehydrogenated to produce an aromatic product stream.

One version of the invention provides for the production of hydrogen from lignin. The process comprises combining lignin with water and an acidic or basic catalyst to form an intermediate stream having deoxygenated lignin, or lignin-D, and light oxygenates. The intermediate stream is contacted with a decomposition catalyst to generate hydrogen. The intermediate stream is contacted with a hydrogenation catalyst and the hydrogen to form a product stream comprising hydrogenated compounds, wherein the hydrogenated compounds have been deoxygenated. The product stream can be further processed by contacting the product stream with a dehydrogenation catalyst to form a dehydrogenated product stream comprising aromatic compounds. The process can be performed with separate reaction vessels to carry out the reactions sequentially, or the process can be performed in a single reaction vessel to carry out multiple reaction steps simultaneously.

An aspect of this invention allows for the combination of the decomposition catalyst and the hydrogenation catalyst in a single vessel, where the catalysts are admixed, and the process undergoes simultaneous decomposition of the oxygenate and hydrogenation of the deoxygenated lignin. The hydrogen generated by the decomposition of the light oxygenates is consumed in the hydrogenation reaction, facilitating control and limiting the amount of methane formed during the process. The decomposition catalyst and the hydrogenation catalyst can be combined onto the same catalyst particles. The oxygenates generated can comprise oxygenates with methoxy groups, of which one oxygenate is methanol.

Catalysts for reforming the oxygenates to produce hydrogen include a metal dispersed on a support. Preferably, the support is alumina, silica-alumina, silica, boron nitride, silica nitride, a zeolitic material, molecular sieves, and mixtures thereof. A catalyst for use in steam reforming includes nickel alone, or nickel with smaller amounts of at least one noble metal, such as gold, platinum, palladium, rhodium, ruthenium, and iridium. Reforming catalysts can also comprise at least one transition metal selected from the group comprising chromium (Cr), gold (Au), zinc (Zn), copper (Cu), platinum (Pt), silver (Ag), palladium (Pd), rhodium (Rh), rhenium (Re), osmium (Os), ruthenium (Ru), iridium (Ir).

A partial oxidation catalyst for use in this invention comprises a metal selected from IUPAC groups Group 8, 9 or 10 noble metal, or in combination with a Group 11 or Group 12 or Group 14 element and, optionally, with a Group 1 or 2 metal of the Periodic Table of the Elements. Preferential oxidation catalysts comprise ruthenium metal dispersed on a shaped alumina carrier.

In one embodiment, the process includes a first catalyst for decomposition of the lignin is a material comprising at least one metal selected from vanadium, iron, cobalt, ruthenium, copper, nickel, manganese, molybdenum, platinum, gold, silver, palladium, rhenium, rhodium, osmium, and iridium, dispersed on a support. The process also includes a second catalyst for reforming the oxygenate and is a material comprising at least one metal selected from chromium, gold, zinc, copper, platinum, silver, palladium, rhodium, rhenium, osmium, ruthenium, and iridium.

Optionally, the process includes a water-gas shift processing step. The water-gas shift processing step comprises flowing the reformate gas over a third catalyst in the presence of steam at an elevated temperature. The carbon monoxide and steam react to form hydrogen and carbon dioxide, as shown in equation 4.

$$CO + H_2O \rightarrow CO_2 + H_2 \text{ (in the presence of catalyst)} \qquad (4)$$

The third catalyst comprises at least one metal selected from iron, cobalt, nickel, copper, zinc, yttrium, zirconium, niobium, molybdenum, technetium, ruthenium, rhodium, palladium, silver, cadmium, lanthanum, hafnium, tantalum, tungsten, rhenium, osmium, iridium, platinum, gold, and mercury. Preferably, the third catalyst is deposited on a support. Supports include inorganic oxides listed hereinafter, and the process for depositing a catalyst metal on a support are known to one skilled in the art.

Materials suitable for supports include, but are not limited to, inorganic oxides such as silicas, aluminas, titania, zirconia, yttria, and molecular sieves. Other supports include, but are not limited to, carbon, silicon carbide, diatomaceous earth, and clays.

Dehydrogenation catalysts for use with this invention include a catalyst comprising a noble metal, such as platinum, on a support, such as alumina, or silica-alumina, an acidic molecular sieve, a zeolite, or a halogen-treated alumina. Catalysts can include a promoter component on the support. Suitable dehydrogenation conditions include a temperature of between 400° C. and 900° C., a pressure of between 1 kPa and 8000 kPa and a liquid hourly space velocity (LHSV) between 0.1 and 100 hr$^{-1}$. Preferably the conditions include a temperature from about 420° C. to about 550° C., and a pressure from about 100 kPa to 1000 kPa.

Hydrogenation catalysts include a noble metal on a support. Hydrogenation conditions include a temperature from about 280° C. to about 500° C., and a pressure from about 3,000 kPa to about 14,500 kPa, preferably from about 8,500 kPa to about 14,000 kPa, and liquid hourly space velocities (LHSV) of about 0.1 to about 20 hr$^{-1}$. A preferred temperature range is between 280° C. to about 450° C., and a more preferred temperature range is between 280° C. to about 350° C.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A process for the production of hydrocarbons and hydrogen from lignin, comprising:
    combining lignin with water and an acidic or basic catalyst to form an intermediate stream comprising lignin-D and light oxygenates;
    decomposing the light oxygenates with a decomposition catalyst to form a second intermediate stream comprising hydrogen, wherein the decomposition catalyst comprises a mixture of metals on a support; and
    combining the second intermediate stream with a hydrogenation catalyst to form a third stream comprising hydrogenated or partially hydrogenated compounds.

2. The process of claim 1 further comprising contacting the third stream with a dehydrogenation catalyst to form a stream comprising aromatic compounds.

3. The process of claim 1 wherein the light oxygenates comprises alcohols having from 1 to 3 carbons.

4. The process of claim 3 wherein the light oxygenates comprise methanol.

5. The process of claim 1 wherein the decomposition step is performed by decomposing the light oxygenates in the intermediate stream with steam.

6. The process of claim 1 wherein the decomposition step is performed by contacting the light oxygenates in the intermediate stream with a decomposition catalyst.

7. The process of claim 4 wherein the decomposition step is performed by decomposing methanol to form carbon dioxide and hydrogen.

8. The process of claim 1 further comprising separating the hydrogen stream into a hydrogen rich stream and a second stream.

9. The process of claim 1 wherein the support is selected from the group consisting of inorganic oxides, zeolites, molecular sieves, carbon, silica, silica-alumina, boron nitride, silica nitride, and mixtures thereof.

10. The process of claim 1 wherein the metals are selected from the metal selected from chromium, gold, zinc, copper, platinum, silver, palladium, rhodium, rhenium, osmium, ruthenium, iridium and mixtures thereof.

11. The process of claim 1 wherein the hydrogenation catalyst comprises a noble metal on a support.

12. The process of claim 11 wherein the noble metal is selected from the group consisting of platinum (Pt), palladium (Pd), and mixtures thereof.

13. The process of claim 11 wherein the catalyst support is selected from the group consisting of zeolites, molecular sieves, Al$_2$O$_3$, SiO$_2$, MgO, ZrO$_2$, TiO$_2$, mixed metal oxides, carbon, and mixtures thereof.

14. A process for the production of hydrocarbons and hydrogen from lignin, comprising:

combining lignin with water and an acidic or basic catalyst to form an intermediate stream comprising lignin-D and light oxygenates; and contacting the intermediate stream with a decomposition catalyst and a hydrogenation catalyst to form a third stream comprising hydrogenated compounds, wherein the decomposition catalyst comprises at least one metal on a support.

15. The process of claim 14 further comprising contacting the third stream with a dehydrogenation catalyst to form a stream comprising aromatic compounds 16. The process of claim 14 wherein the decomposition catalyst and hydrogenation catalyst are admixed in a single vessel.

17. The process of claim 14 wherein the decomposition catalyst and hydrogenation catalyst are intermingled on the same catalyst particles.

18. The process of claim 14 wherein the oxygenates comprise methanol.

19. The process of claim 14 wherein the hydrogen produced by the decomposition of the light oxygenates is consumed in the hydrogenation of organic compounds in the intermediate stream.

* * * * *